(12) United States Patent
Bland et al.

(10) Patent No.: US 11,458,661 B2
(45) Date of Patent: Oct. 4, 2022

(54) METHOD FOR PRODUCING A MULTI SHOT INJECTION MOLDED ARTICLE INCORPORATING A HEAT SHIELD

(71) Applicant: U.S. Farathane Corporation, Auburn Hills, MI (US)

(72) Inventors: Wayne Bland, Fort Gratiot, MI (US); Gregory Paul Barthlow, Dryden, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 104 days.

(21) Appl. No.: 16/842,847

(22) Filed: Apr. 8, 2020

(65) Prior Publication Data

US 2021/0114269 A1    Apr. 22, 2021

Related U.S. Application Data

(60) Provisional application No. 62/916,270, filed on Oct. 17, 2019.

(51) Int. Cl.
*B29C 45/16* (2006.01)
*B29C 45/14* (2006.01)
(Continued)

(52) U.S. Cl.
CPC .... *B29C 45/1676* (2013.01); *B29C 45/14786* (2013.01); *B29C 45/14811* (2013.01); *B29C 45/1671* (2013.01); *B29K 2021/003* (2013.01); *B29K 2023/12* (2013.01); *B29K 2025/06* (2013.01); *B29K 2067/003* (2013.01); *B29K 2077/00* (2013.01); *B29K 2995/0015* (2013.01); *B29L 2031/3041* (2013.01)

(58) Field of Classification Search
CPC .......... B29C 45/1676; B29C 45/14786; B29C 45/14811; B29C 45/1671
See application file for complete search history.

(56) References Cited

U.S. PATENT DOCUMENTS 5,308,571 A * 5/1994 Stiles ...................... B29C 70/86
                                                        264/258
5,846,634 A * 12/1998 Werth .................... B60C 23/18
                                                        428/156

(Continued)

FOREIGN PATENT DOCUMENTS

CN          108544721 A       9/2018

*Primary Examiner* — Edmund H Lee
(74) *Attorney, Agent, or Firm* — Dinsmore & Shohl LLP

(57) ABSTRACT

A method and assembly for forming a multi-shot panel for a vehicle including the steps of providing a mold and forming therein a main body of the panel from a first rigid material, the step of forming the main body further including forming a multi-sided recess. The rigid material is transferred to a second reconfiguration of the mold for forming thereupon at least one second softer material. The panel is then transferred to a third reconfiguration of the mold for forming the heat deflecting shield. Alternative, a two shot injection molded panel can be removed from the mold and a previously formed heat deflecting shield can be attached along edges of the main body defining the multi-sided recess. In either variant, locking features are designed into the interface geometry between the heat deflecting shield and rigid main body.

10 Claims, 12 Drawing Sheets

(51) Int. Cl.
*B29K 77/00* (2006.01)
*B29K 25/00* (2006.01)
*B29K 67/00* (2006.01)
*B29K 21/00* (2006.01)
*B29L 31/30* (2006.01)
*B29K 23/00* (2006.01)

(56) References Cited

U.S. PATENT DOCUMENTS

| | | | |
|---|---|---|---|
| 6,401,961 B1* | 6/2002 | Butler | B29C 49/20 220/560.01 |
| 6,579,487 B1* | 6/2003 | Lichtinger | B29C 37/0082 264/327 |
| 7,060,215 B2* | 6/2006 | Schoemann | B29C 45/1635 425/127 |
| 2004/0017023 A1* | 1/2004 | Schoemann | B29C 45/1635 264/255 |
| 2004/0056382 A1* | 3/2004 | Shaner | B29C 45/1676 264/328.8 |
| 2005/0046075 A1* | 3/2005 | Youngs | B29C 45/1635 425/129.1 |
| 2005/0244610 A1* | 11/2005 | Cvengros | B29C 45/1671 428/137 |
| 2016/0016230 A1* | 1/2016 | Campomanes | F23R 3/002 264/118 |
| 2019/0076916 A1 | 3/2019 | Marcin | |
| 2020/0123974 A1* | 4/2020 | Affinita | B29C 45/1703 |

* cited by examiner

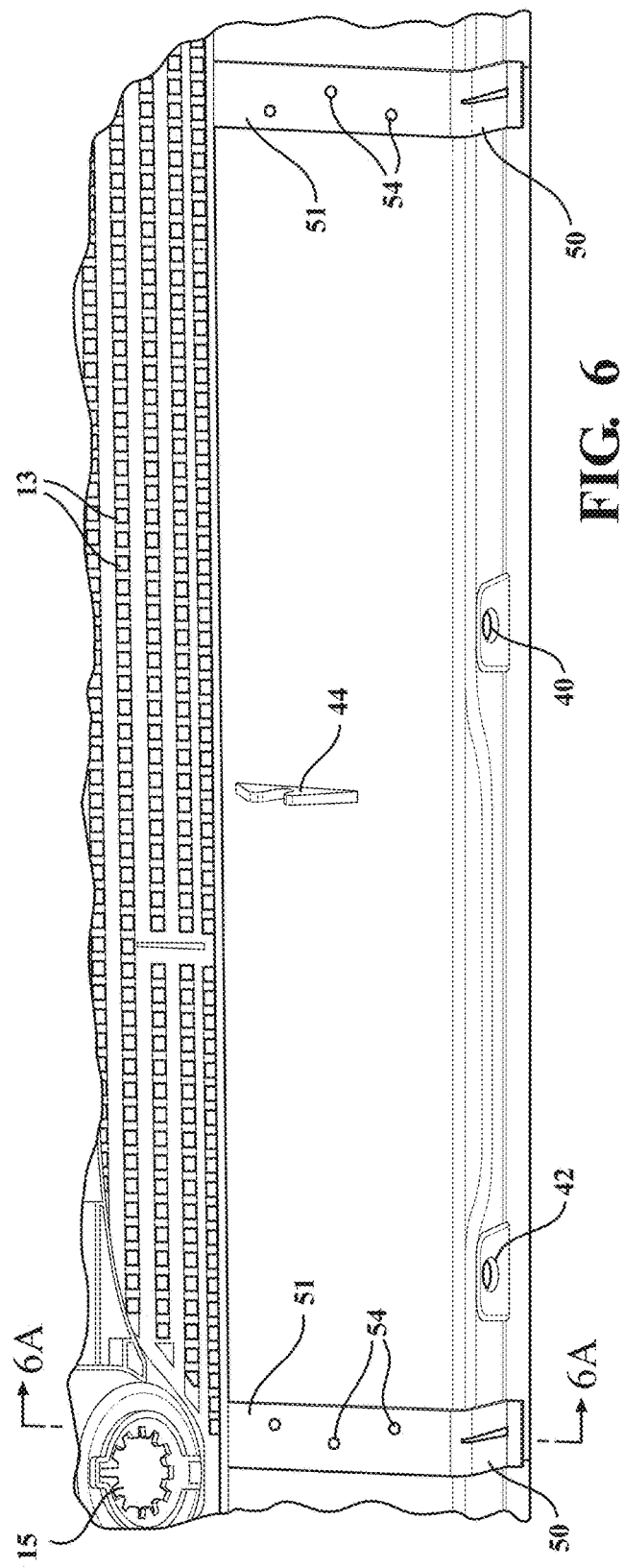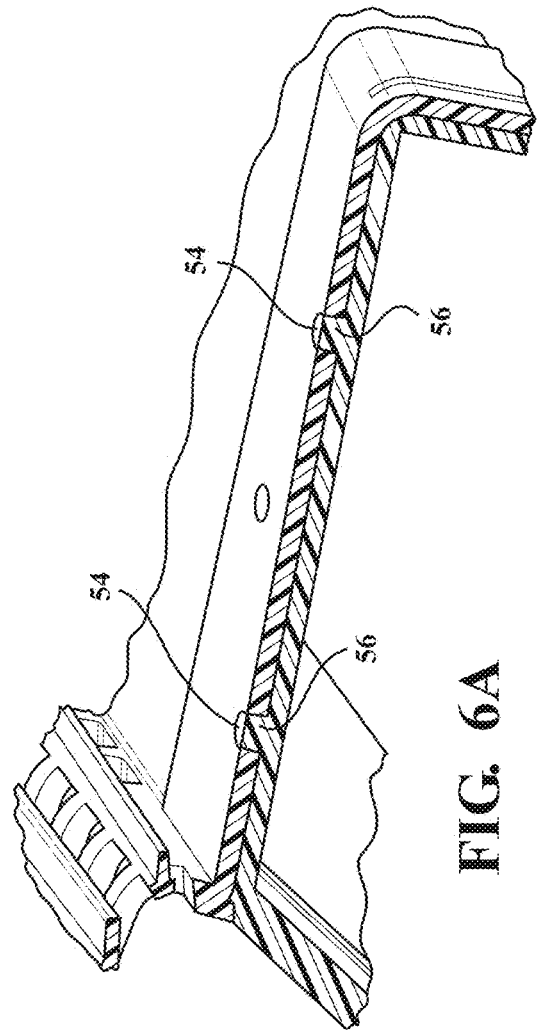

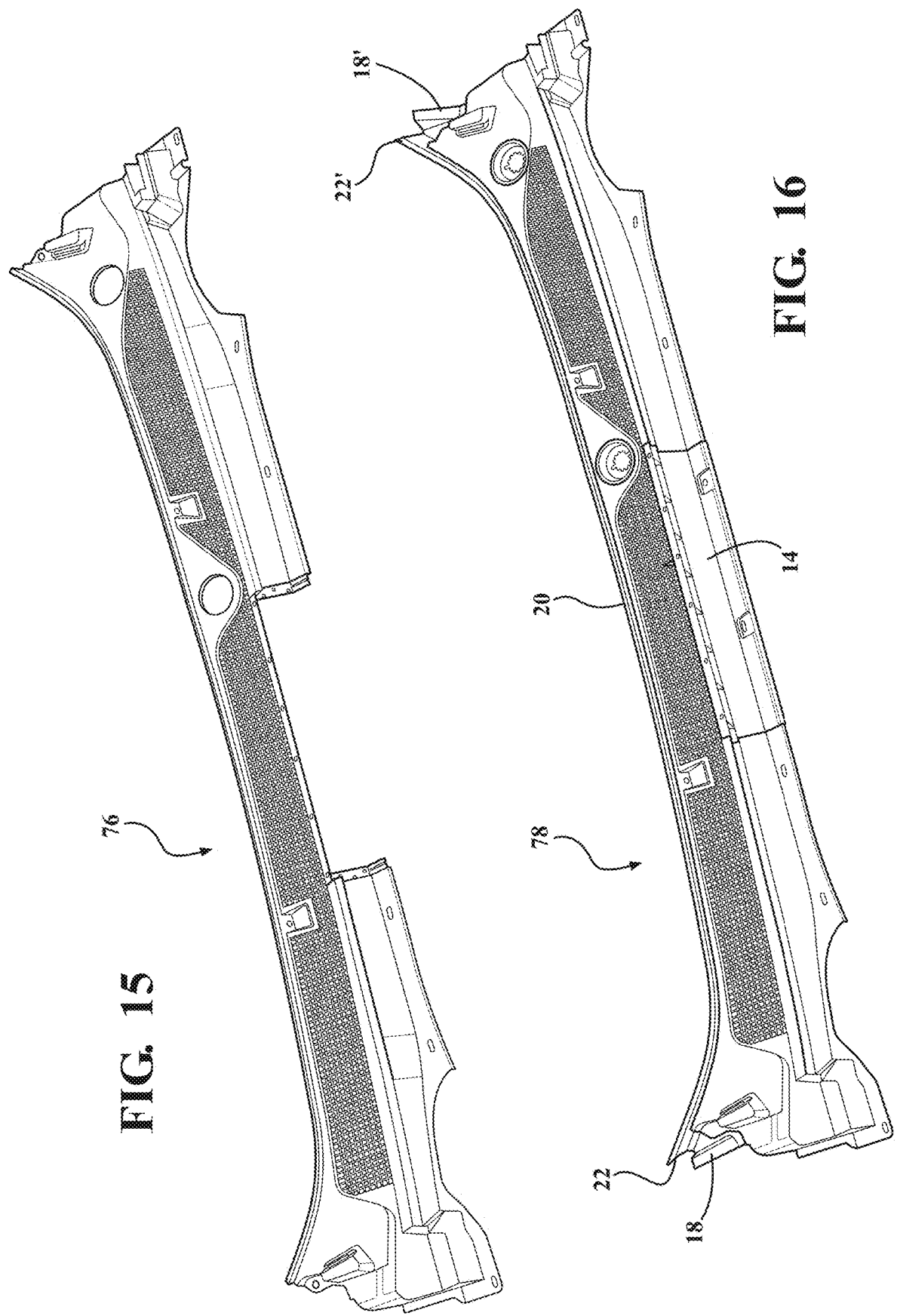

METHOD FOR PRODUCING A MULTI SHOT INJECTION MOLDED ARTICLE INCORPORATING A HEAT SHIELD

CROSS REFERENCE TO RELATED APPLICATIONS

The present application claims the priority of U.S. Ser. No. 62/916,270 filed Oct. 17, 2019.

FIELD OF THE INVENTION

The present invention relates generally to a composite plastic air inlet panel such as for use in automotive applications. More specifically, the present invention discloses a multi-shot injection molded air inlet panel including a first hard-shot material, a second soft-shot material and a third shot heat deflecting shield.

BACKGROUND OF THE INVENTION

The prior art is documented with examples of heat shield panel technology such as associated with injection molding applications. Current air inlet panel designs include a plasticized part produced according to a rotary two shot injection molding press operation and which includes a first rigid shot of plasticized material for forming a main body of the article, this followed by a second softer portion injection molded to one or more locations of the rigid material.

Other examples include US 2019/0076916 to Marcin, which teaches a method of manufacturing a heat shield panel assembly. The method includes the step of forming a heat shield panel, wherein the heat shield panel includes one or more orifices, and the step of forming each of one or more threaded studs through operations including injecting melted wax into a negative cavity of a threaded studs. Other steps include allowing the wax to solidify to form a positive pattern of the threaded stud, removing the positive pattern of the threaded stud from the negative cavity of the threaded stud, coating the positive pattern of the threaded stud with a ceramic, and melting the positive pattern of the threaded stud away from the ceramic. The ceramic forms a second negative cavity of the threaded stud, with subsequent steps include pouring melted metal into the second cavity, allowing metal in the second cavity to solidify to form the threaded stud and removing the ceramic from the threaded stud.

Also disclosed is CN 108544721 which teaches an injection molding machine with a simple type diagonal slide. A mold structure includes a mold plate mechanism assembly, an ejection system assembly, a mold pouring system assembly, a mold diagonal core-pulling mechanism assembly, a mold forming assembly and a mold plate guide mechanism assembly. The mold adopts a hot runner nozzle and cold rubber hidden type sprue pouring manner and, according to the layout of mold cavities, the mold is provided with two mold cavities. The mold solves the technical problem of demolding of a diagonal side hole of a product with a large-angle diagonal hole on the mold core side is difficult, and consequently automatic injection molding production of the product cannot be achieved. The beneficial effects that after a locking block is used for driving, core pulling and demolding can be reliably carried out on the large-angle diagonal hole, and the product automatic injection molding production is achieved.

SUMMARY OF THE PRESENT INVENTION

The present invention discloses a method for forming a multi-shot panel for a vehicle, such as not limited to an air inlet panel, and which includes the steps of providing a mold and forming therein a main body portion of the panel from a first rigid material, the step of forming the main body portion further including forming a multi-sided recess. Other steps include transferring the main body portion to a second reconfiguration of the mold and forming thereupon at least one second softer material, following which the mold is removed from the panel, and a separately formed heat deflecting shield is attached within the multi-sided recess of the panel.

Additional steps include forming a dovetail joint between overlapping edge surfaces defined along the multi-sided recess between the main body portion and the attachable heat shield. Additional steps include forming a post and hole joint between overlapping edge surfaces defined along the multi-sided recess between the main body portion and the attachable heat shield.

Other steps include forming the main body portion of a polypropylene (PP) or polyethylene terephthalate (PET) material and forming the second softer material from a thermoplastic styrenic elastomer (TPS) or other thermoplastic elastomer (TPE). Additional steps include forming the heat deflecting shield from any of a thermoset or other polymeric compound material which provides acceptable heat deflecting/resistant properties as the location of maximum heat exposure.

Additional steps include the providing of a heat deflecting layer being not limited to any of an integrated nylon, aluminum layer or a heat reflecting ceramic fabric which is pre-positioned within the second molding operation for forming the heat shield, in combination with the introduction of the suitable heat resistant and polymeric backing material step of forming the heat deflecting shield to include bottom angled edges proximate apertures which, upon installation within the main body portion, correspond with the placement of spaced apart apertures along the lower edge of the main body portion for receiving associated mounting fasteners or clips.

Other steps include forming a reverse surface extending projection on the heat deflecting shield for providing an additional mount location for the completed panel assembly within the vehicle. The step of forming the main body portion further includes forming each of aperture grating at interior extending locations associated with the first hard shot material, as well as wiper blade shaft mount locations and spaced apart lower edge proximate clip/fastener mounting apertures.

Other variations of mechanical locking features between the heat shield and the first shot polypropylene rigid body include the formation of recesses or through holes in the shield which align with opposing and receiving locking features, such as mating protrusions, which are configured proximate the cutout recess edges formed in the first shot rigid main body of the panel. Yet additional steps include separately formed the heat shield with reinforcing angled reinforced portions between a main surface and upper angled edge surface for providing additional structural integrity along an upper extending length when secured to the multi-sided recess. The step of forming the heat shield can further include providing it with a modified "U" shape.

A variation of the present method for forming a three shot injection molded panel for a vehicle includes the steps of providing a mold and forming therein a main body portion of the panel from the first rigid material, the step of forming the main body portion further including forming a multi-sided recess corresponding to a cutout portion for subsequent formation or attachment of the heat shield panel.

Additional steps include transferring the main body portion to a second reconfiguration of the mold and forming thereupon at least one second softer material.

The panel is transferred to a third reconfiguration of the mold for forming the heat deflecting shield, such again including forming the third injection molded heat resistant material from such as nylon. Simultaneous with formation of the heat shield, the initial configuration of the mold assembly allows for a repeat first shot of the rigid (polypropylene) material occurs to initiate a succeeding part formation operation.

BRIEF DESCRIPTION OF THE DRAWINGS

Reference will now be made to the attached drawings, when read in combination with the following detailed description, wherein like reference numerals refer to like parts throughout the several views, and in which:

FIG. 6 is a similar view to FIG. 5 and depicting a corresponding post and hole joint feature for securing overlapping end locations of the heat shield to the main panel;

FIG. 6A is an enlarged, rotated and partial view of the overlapping interface established between the post and hole joint for facilitating fast assembly of the separately produced heat shield to the mating recess location of the main panel;

FIG. 15 is a part illustration of the first shot rigid body formed in the first step; and FIG. 16 is a succeeding part illustration of the completed three shot panel formed in the third shot nylon shield forming step, the intermediate second shot formation of the softer edge materials not being depicted in the mold assembly of FIG. 14 however represented in the part of FIG. 16.

DETAILED DESCRIPTION OF THE PREFERRED EMBODIMENTS

With reference now to appended illustrations, the present invention discloses an air inlet panel or other plasticized composite panel, such as for use in automotive applications. More specifically, the present invention discloses a three shot injection molded panel which is formed within a mold assembly (reference being made to FIG. 14), this including a first hard-shot plasticized material (such as a polypropylene or polyethylene terephthalate) forming a main body, a second softer-shot material (such as a thermoplastic elastomer or thermoplastic styrenic elastomer), such as which can be applied along upper edge of the main body in contact with a vehicle windshield as well as within windshield wiper shaft mount locations, and a third shot (such as nylon) heat deflecting shield.

Figure 1:
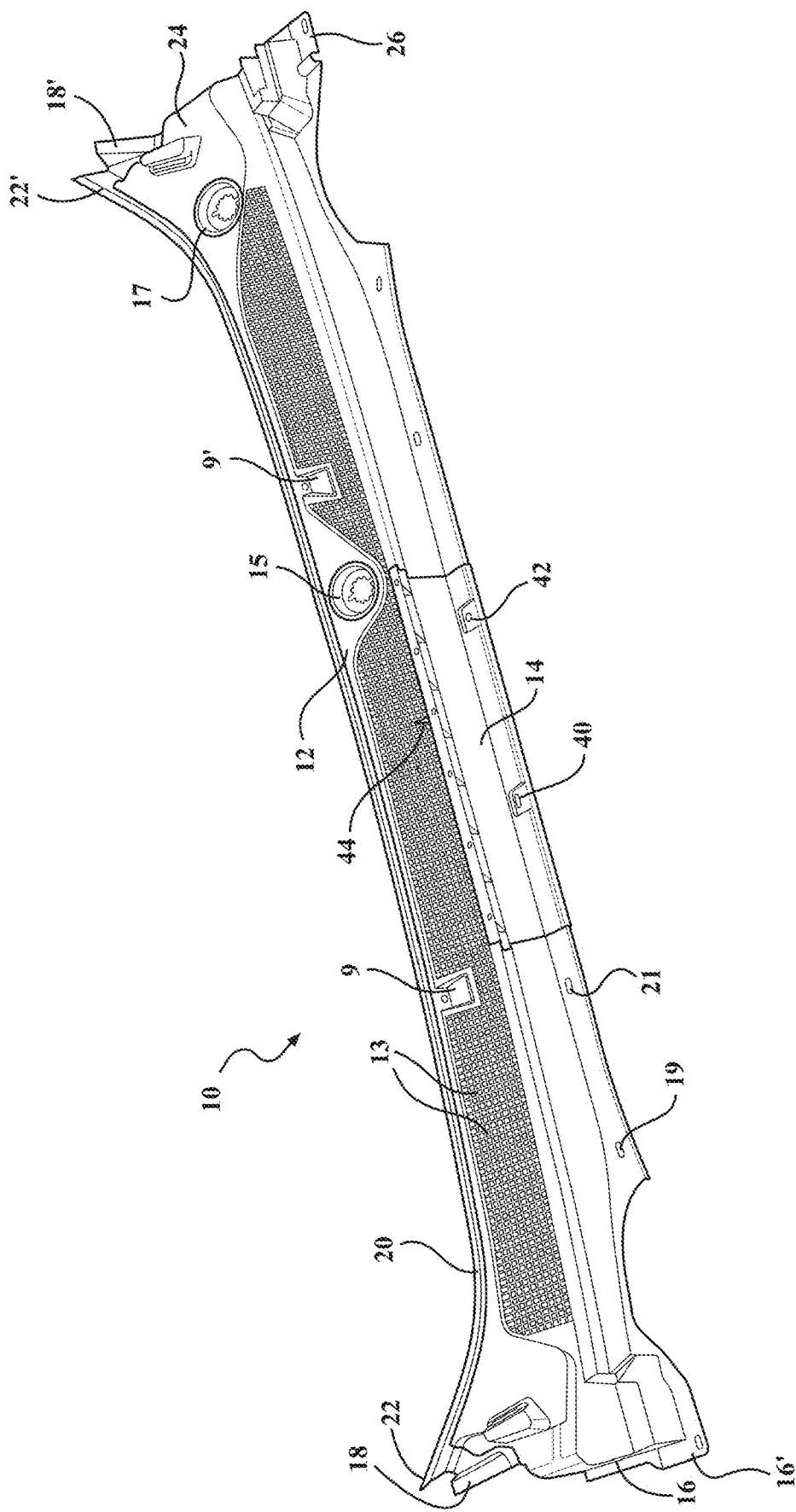
FIG. 1 is a perspective view of a panel produced according to a multi-shot injection molding assembly and which include a heat shield portion.

With reference initially to FIG. 1, a perspective view is generally depicted at 10 of a panel produced according to a multi-shot injection molding assembly and which includes a main body 12 and a separately attachable heat shield 14. For purposes of the present disclosure, the heat shield 14 is provided as a third shot material (such as not limited to nylon) as defined within a further reconfiguration of the mold assembly. As will be further described, the present invention also contemplates the heat shield 14 being separately formed and attached to the dual shot main body 12 according to any suitable post-molding attachment operation (either manual or automated), such utilizing mechanical locking features in order to secure to the main body in order to provide heat resistance to the panel from proximate located heat generating components within the vehicle engine compartment.

Figure 2:
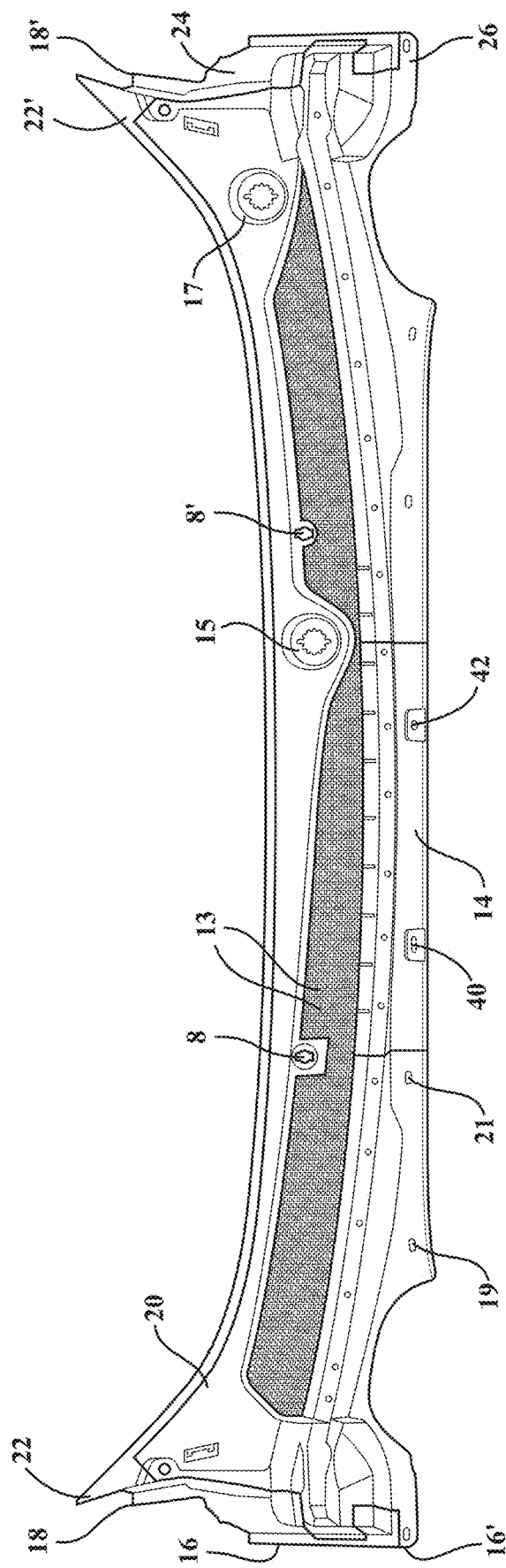
FIG. 2 is a succeeding plan view of FIG. 1 and showing the dual hard/soft shot panel in combination with the separately molded heat deflecting shield attached thereto.

FIG. 2 is a succeeding plan view of FIG. 1 and which further depicts the main body 12 constructed of a dual first injection molded (hard shot) and succeeding second injection molded (second soft shot) of respective selected plasticized materials. The injection formed profile of the first shot rigid main body 12 can further include such features as main fastener receiving mounting locations (see at 9 and 9' in FIG. 1 which receive corresponding locking fasteners 8 and 8' depicted in FIG. 2). The main panel body 12 also depicts aperture grating 13 at interior extending locations associated with the first hard shot material, as well as (without limitation) defining wiper blade shaft mount locations and spaced apart lower edge proximate clip/fastener mounting apertures 19, 21, et. seq. The first hard shot injection molding plasticized material which consists of most of the main body 12 can include any suitable rigid material, such as without limitation a polypropylene (PP) or polyethylene terephthalate (PET) which is produced according to a first injection molding operation utilizing any suitable mold operation.

Figure 14:
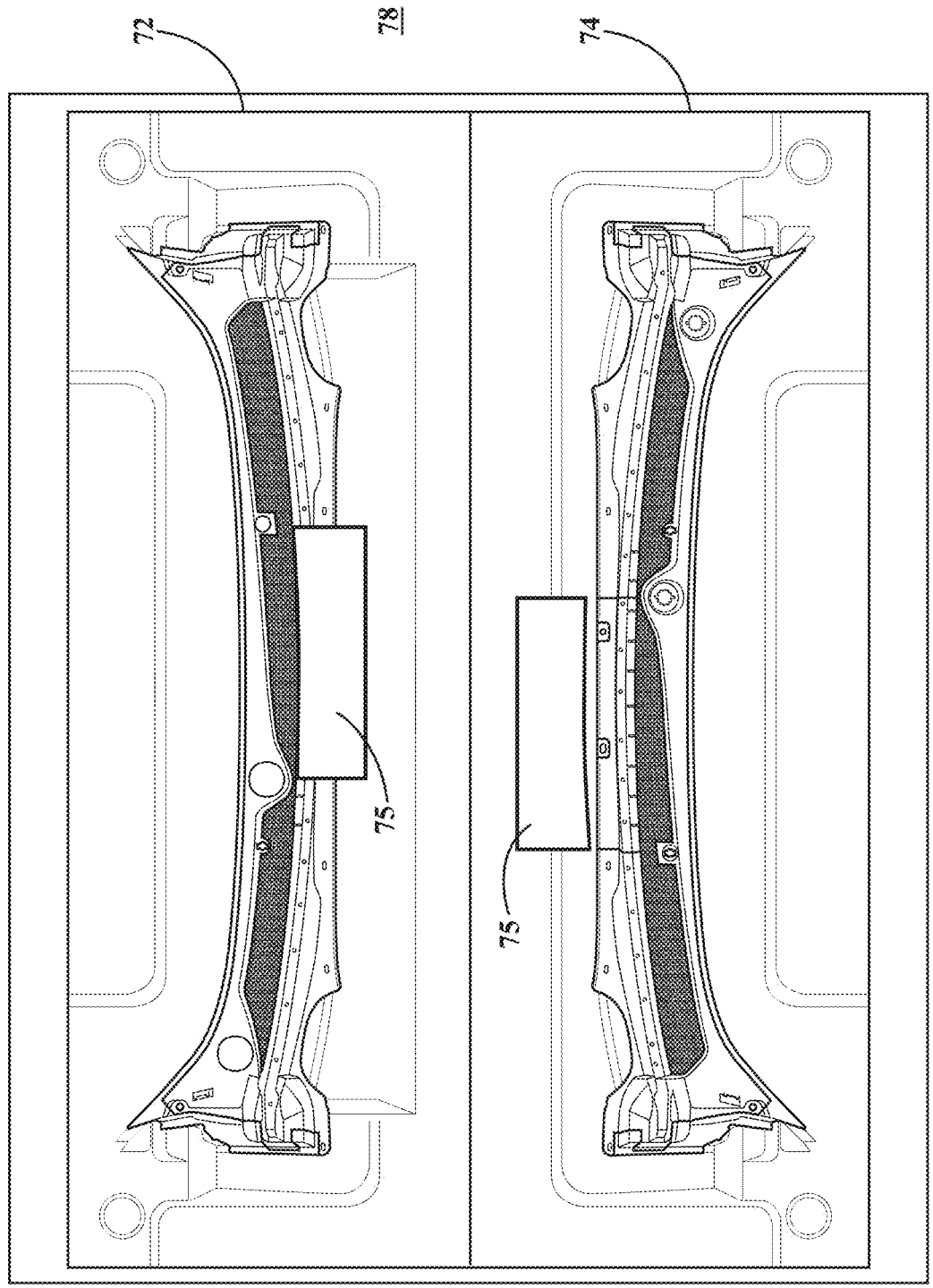
FIG. 14 is an illustration of a cavity half representative of the three shot injection molding process according to the present invention and showing subset representations of the first shot rigid body formation step and subsequent shot heat shield/nylon portion formation step.

Although not shown, the present invention can include any suitable die slide and or pick-and-place technology utilized with the mold operation (such as again partially depicted with subsequent reference to FIG. 14) for transferring the first hard shot formed plasticized portion of the panel for subsequent repositioning in order to receive a succeeding second shot softer edged plastic material.

The second injection molding, or shot, of softer shot material includes, at a minimum, being applied within the circular rim locations 15 and 17 defining the windshield wiper blade shaft mount locations associated with an upper extending edge 20, such extending to opposite end configurations 22 and 22' for contacting the windshield (not shown). Additional potential areas for receiving the second soft shot injection molding can include adjoining first and second side portions 18/18', and, depending upon the configuration and application of the overall panel, other features of the main body 12 can also include applications of the second shot softer material, such being formed without limitation along any one or more of other first end corner locations 16 and 16' and second end corner locations 24, and 26.

The second softer shot material (again including such as at least upper windshield contact edging 20 with end configurations 22 and 22' and corresponding contacting side locations 18/18'), can include, without limitation, any type of thermoplastic elastomer (TPE) not limited to a thermoplastic styrenic elastomer (TPS), which is the most rubber-like of thermoplastic elastomers in terms of providing both flexibility and elasticity. Other acceptable candidates for the second soft shot injection molded material can include, without limitation, styrene-ethylene-butylene-styrene (also known as SEBS), which is another type of thermoplastic elastomer (TPE) and which behaves like rubber without undergoing vulcanization. As is further known, SEBS maintains the properties of strength and flexibility, has excellent heat and UV resistance, and is easy to process.

Figure 3:
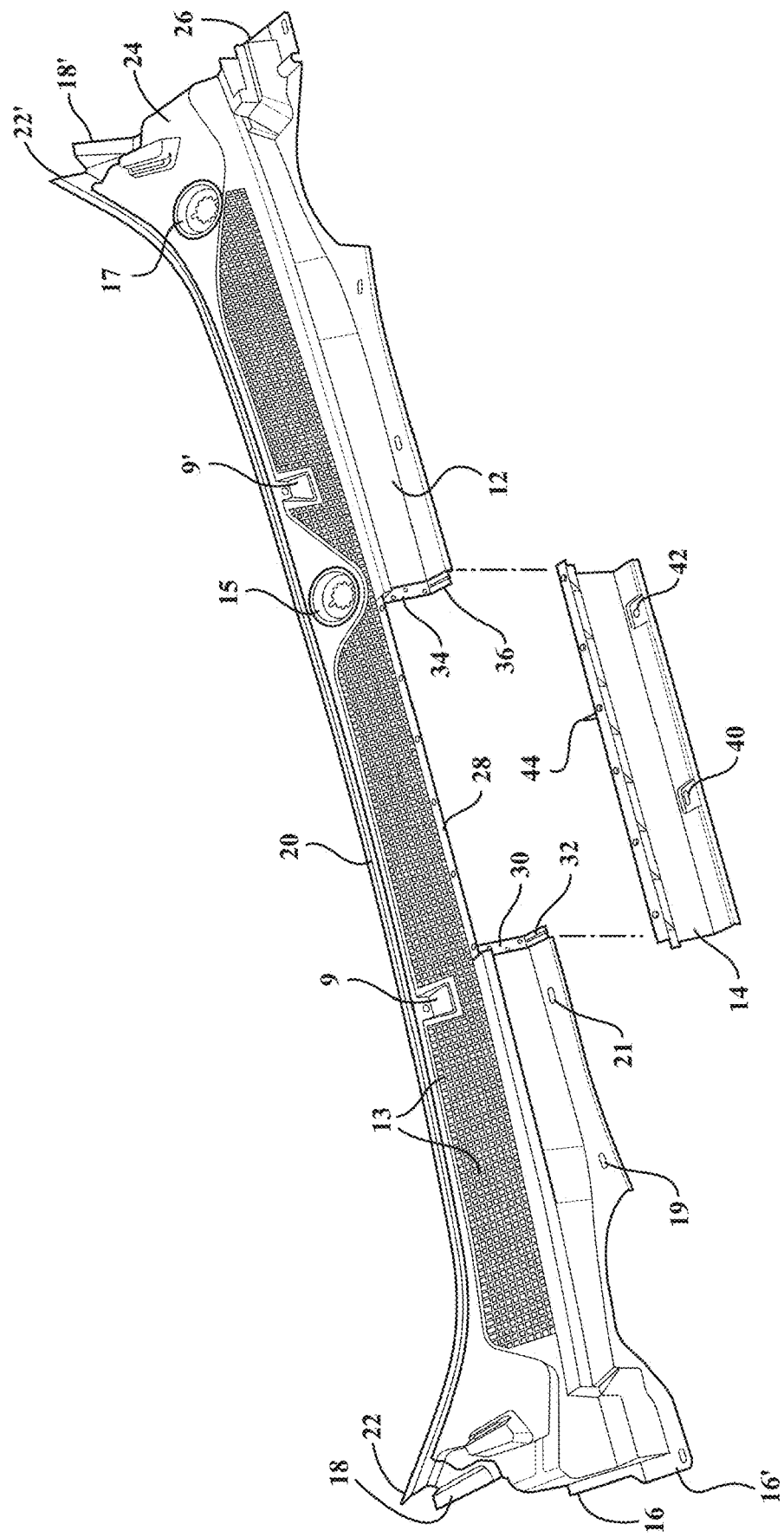
FIG. 3 is an exploded view of the main panel and heat deflecting shield according to one non-limited variant of the present invention.

FIG. 3 is an exploded view of the main body portion 12 and heat deflecting panel 14 according to one non-limited variant of the present invention. The first shot formation of the rigid material defining the main body portion 12 includes the creation of a multi-sided recess profile defined by length extending edge 28 and first and second end defining pairs of angled surfaces 30/32 and 34/36, these each defining a substantial "L" shape in cross section.

The bracket 14, as separately described, can be formed in a separate injection molding operation and/or can be produced according to any other suitable forming process and subsequently installed in any of a manual or automated post-fabricating step in order to be secured to the main panel 12 within its cutout profile and in order to define a smooth edge interface (again FIGS. 1-2). As further shown, the rigid heat shield (reflecting or deflecting) is configured as a further panel 14 and includes a multi-sided configuration in cross view and can include a generally modified "U" shape or other configured cross sectional profile and as best shown in FIG. 3. Without limitation, and as best shown in FIG. 4, the rigid panel 14 may be formed so that it includes angled reinforced portions 38 between its main surface and upper angled edge surface for providing additional structural integrity along its upper extending length and when secured to the interior cutout profile of the main body portion 12.

The heat shield panel 14 is further designed in order to provide targeted heat deflecting properties at a given location of the main body portion 12 (e.g. cowl) and in order to otherwise avoid having to mold the main body portion 12 substantially entirely of the heat deflecting material. Without limitation, the heat deflecting panel 14 can be molded of a suitable thermoset or other polymeric compound material which provides acceptable heat deflecting/resistant properties as the location of maximum heat exposure. As will be further described, a preferred variant of the heat shield can include a nylon material.

It is also envisioned that the heat deflecting shield 14 may be constructed to include any of a suitable heat deflecting layer which could include an aluminum layer and/or potentially a heat reflecting ceramic fabric or the like, such as which can be pre-positioned within the second molding operation for forming the heat shield panel 14 in combination with the introduction of the suitable heat resistant and polymeric backing material. The heat shield panel 14 shown in FIG. 3 may also include such as bottom angled edge proximate apertures 40, 42 (which upon installation within the main panel correspond with the placement of the spaced apart apertures 19, 21, et. seq. along the lower edge of the main body portion 12 for receiving associated mounting fasteners or clips), as well as a reverse surface extending projections 44 (see also FIGS. 5-6) for providing an additional mount location for securing the panel 12 within the vehicle.

Figure 4:
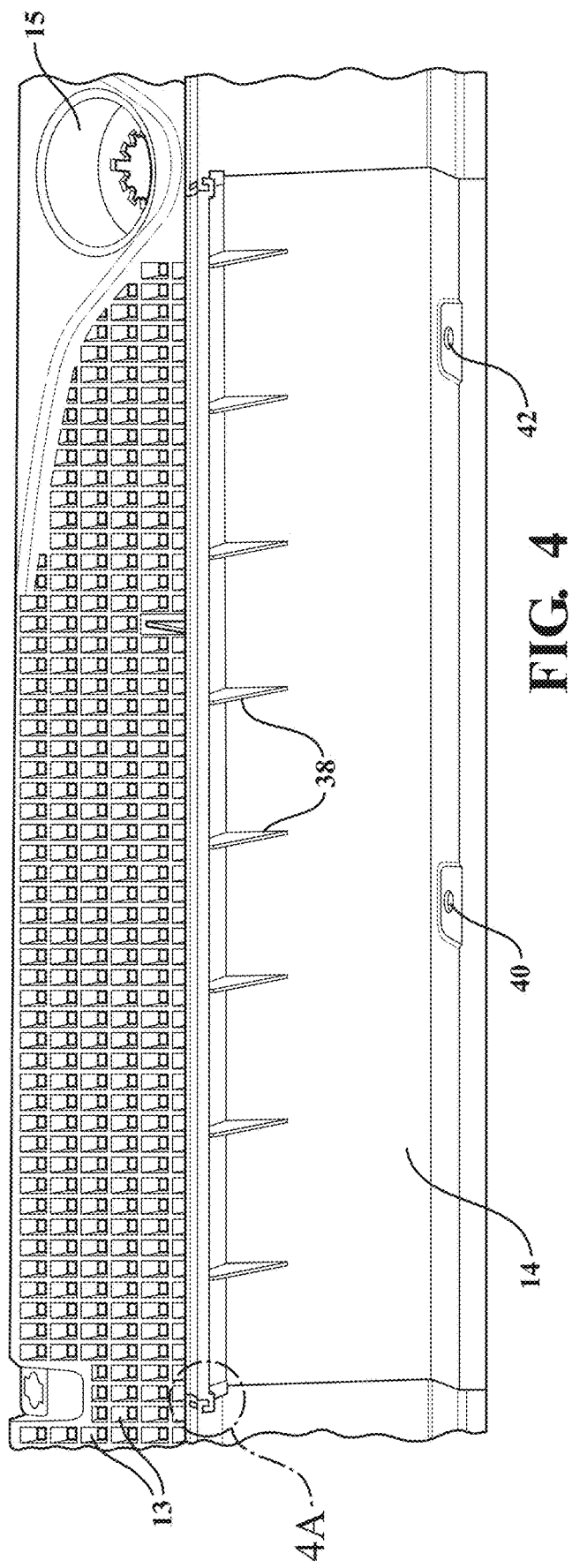
FIG. 4 is an enlarged view of an intermediate portion of the main panel in combination with the separately attachable heat shield.

With succeeding reference to FIG. 4, an enlarged view is shown of an intermediate portion of the main body 12 of the panel in combination with the separately attachable heat shield 14. The angled reinforced portions 38 are again depicted between the main surface and upper angled edge surface of the shield for providing the desired additional structural integrity along its upper extending length when secured to the interior cutout profile of the main body 12.

Figure 4A:
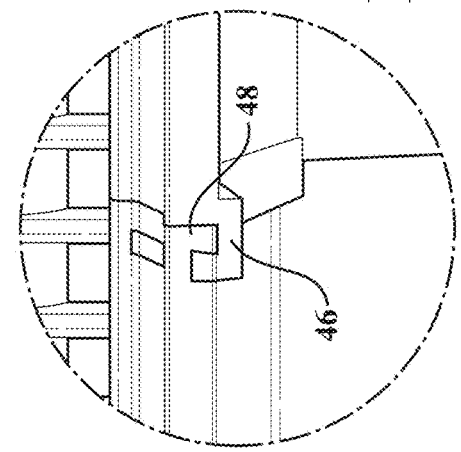
FIG. 4A is a further enlarged view of a dovetail joint established between a corner location of the heat shield and an aligning interior corner receiving location of the main panel.

FIG. 4A is a further enlarged view of a designated portion of FIG. 4 of a dovetail joint established between a corner edge configuration 46 of the heat shield panel 14 and an aligning interior corner receiving location 48 of the main body portion 12. As shown, the corner edge configuration 46 is depicted in a modified "U" shape and, upon aligning with an opposing projection corresponding to the receiving location 48, such providing a tactile snap fit engagement at the interface assist in securing each of opposite corner edges of the planar and panel shaped heat shield 14 to opposing interior corner edges of the main body 12.

Without limitation, the multi-sided recessed cross sectional profiles associated with each of the main body 12 and the heat deflecting shield 14 can be modified from that shown and in order to include different dovetail engagement profiles, as well as any type of tab-slot engagement or other snap-fit features which utilize the resilient engagement properties of the main body 12 and likewise panel shaped heat deflecting shield 14 established by and between the opposing engagement features 46/48.

Figure 5:
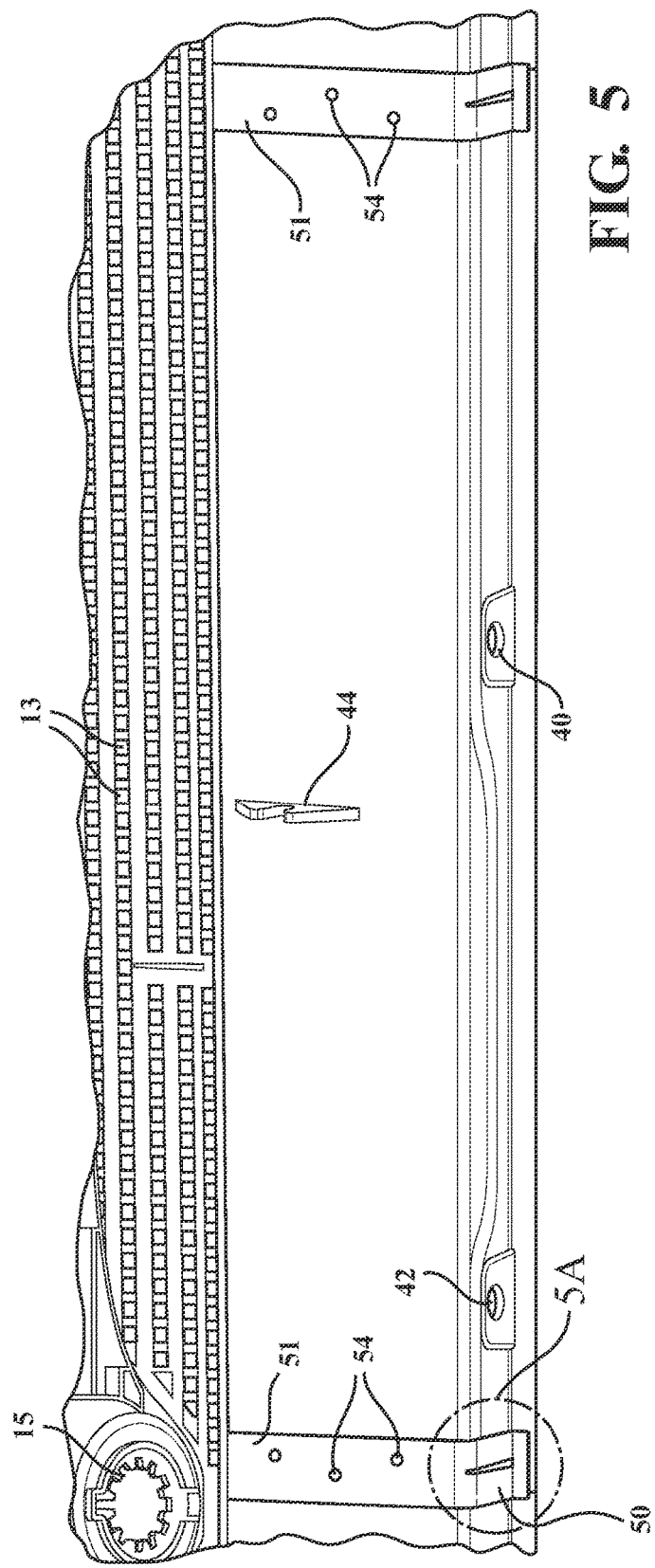
FIG. 5 is a one hundred and eighty degree rotated reverse view of the main panel of FIG. 4 and depicting a corresponding rear edge of the dovetail joint feature for securing the heat shield panel.
Figure 5A:
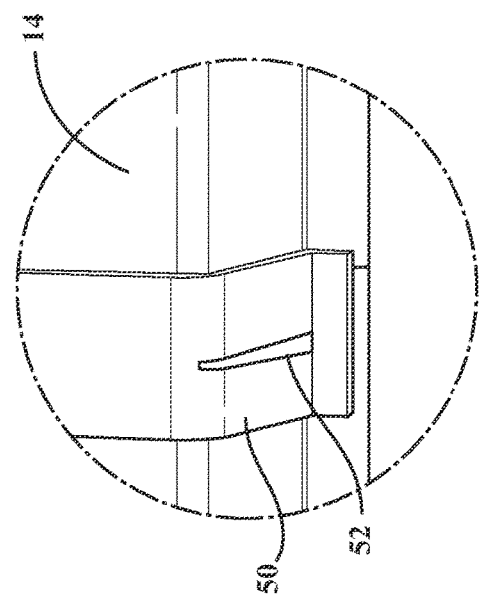
FIG. 5A is a further enlarged view of the dovetail joint feature of FIG. 5 corresponding to the interior support location of the main panel.

Proceeding to FIG. 5 and FIG. 5A, illustrated is a one hundred and eighty degree rotated reverse view of the main panel of FIG. 4 and depicting a corresponding rear edge of the dovetail joint feature for securing the heat shield 14 to the main body 12. Without limitation, this can include the provision of a multi-sided and extending tab 50 which is injection molded as part of the first hard shot material of the main body 12, a pair of such tabs corresponding in placement to opposite interior side edges of the configured recess, and over which is abutted overlapping side extending portions of the heat deflecting panel or shield 14, these being biased by the tabs 50.

In combination with the snap-fit of the opposing features 46/48 located at a top corner interface between the main body 12 and heat deflecting shield 14, the flex tab 50 provides an additional opposite and lower edge abutting interface which assists in both location and firm retention of the heat deflecting shield 14 to the main body 12 once installed. Without limitation, the flex tab 50 can include an interior cutout profile (see at 52 as bests shown in FIG. 5A), the opposing receiving location of the heat shield can be envisioned to include a mating narrow tab projection for seating through the cutout profile 52 in order to provide additional biased engagement, as will be described this can be provide additional or alternative to the post and hole (also button) retention feature of FIGS. 6A-6B.

FIG. 6 is a similar view to FIG. 5 and depicting a corresponding post and hole joint feature for securing overlapping end locations of the heat shield 14 to the first shot rigid main body 12. The main body 12 again illustrates the pair of multi-sided flex tabs 50 extending at each of the first and second opposite sides of the recess profile defining the main hard shot material of the main body 12. A main extending portion 51 of each flex tab 50 further depicts a series of apertures referenced by closed rim profiles 54, these opposed by surface projecting posts 56, as further depicted in the enlarged, rotated and partial view of FIG. 6A of the overlapping side interfaces established between the post and hole joint. As shown, and upon aligning the sides of the heat shield post 14 to the main body portion 12 so that the associated dovetail portions and inter-engaged, the posts 56 are likewise seated within the aligning apertures for facilitating fast assembly of the separately produced heat shield panel to the mating recess location of the main panel.

Figure 7:
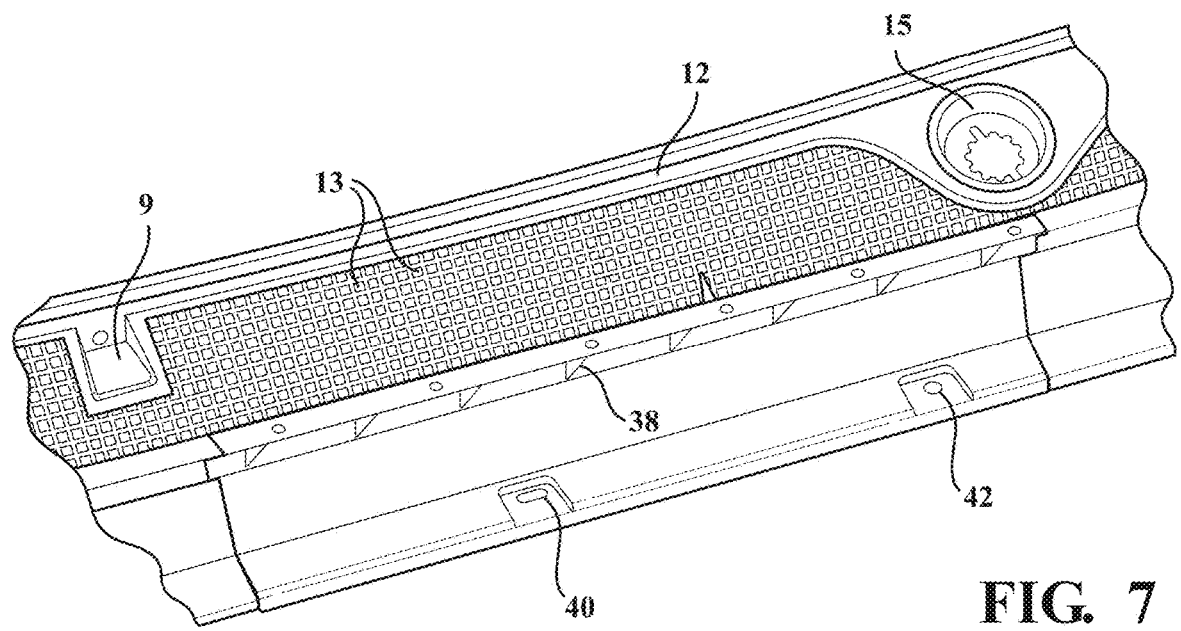
FIG. 7 is an enlarged intermediate illustration of the main panel and illustrating the reinforced rib structure associated with and engaging and length extending end of the heat shield.
Figure 8:
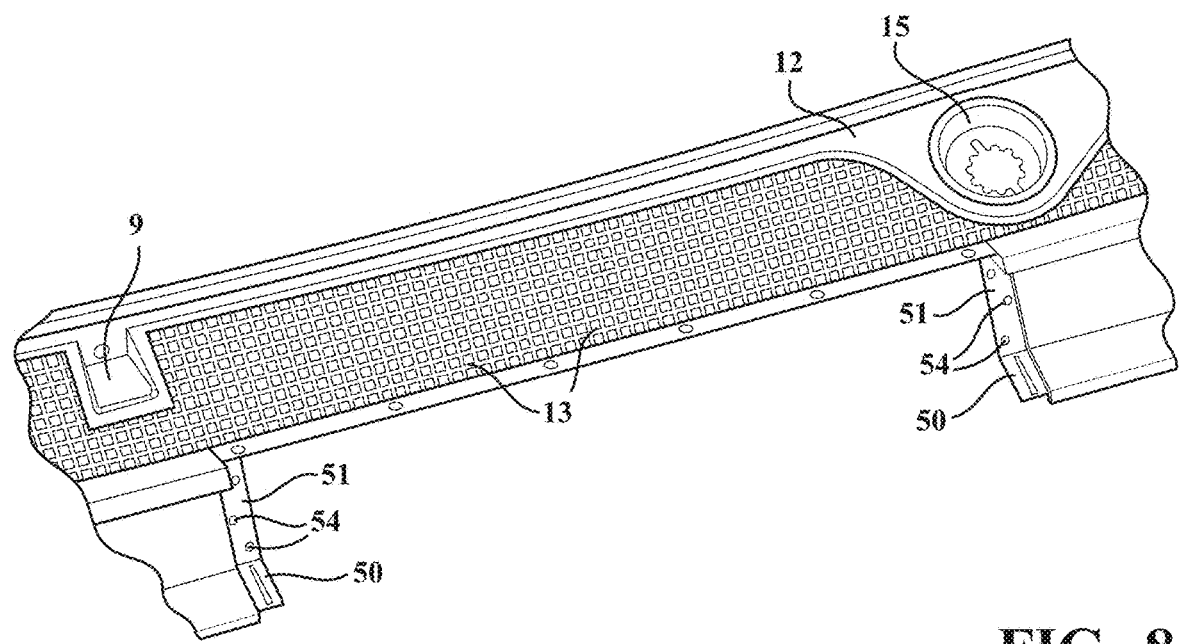
FIG. 8 is an enlarged intermediate portion of the main panel similar to that shown in FIG. 3 and depicting the interior recess edged defined profile of the main panel for facilitating quick engagement of the heat shield to the main panel.

FIG. 7 is an enlarged intermediate illustration of the main body portion 12 rotated one-hundred and eighty degrees from that shown in FIG. 6 and illustrating the reinforced rib structures 38 also depicted in FIG. 4 and as viewed from another angle. As previously described, the reinforced ribs are arranged transversely and in spaced apart fashion along a length extending end of the heat shield panel. FIG. 8 is an enlarged intermediate portion of the main panel similar to that shown in FIG. 3 and again depicting the interior recess edged defined profile of the main panel for facilitating quick engagement of the heat shield 14 to the rigid first shot body 12 defining the main panel.

Figure 9:
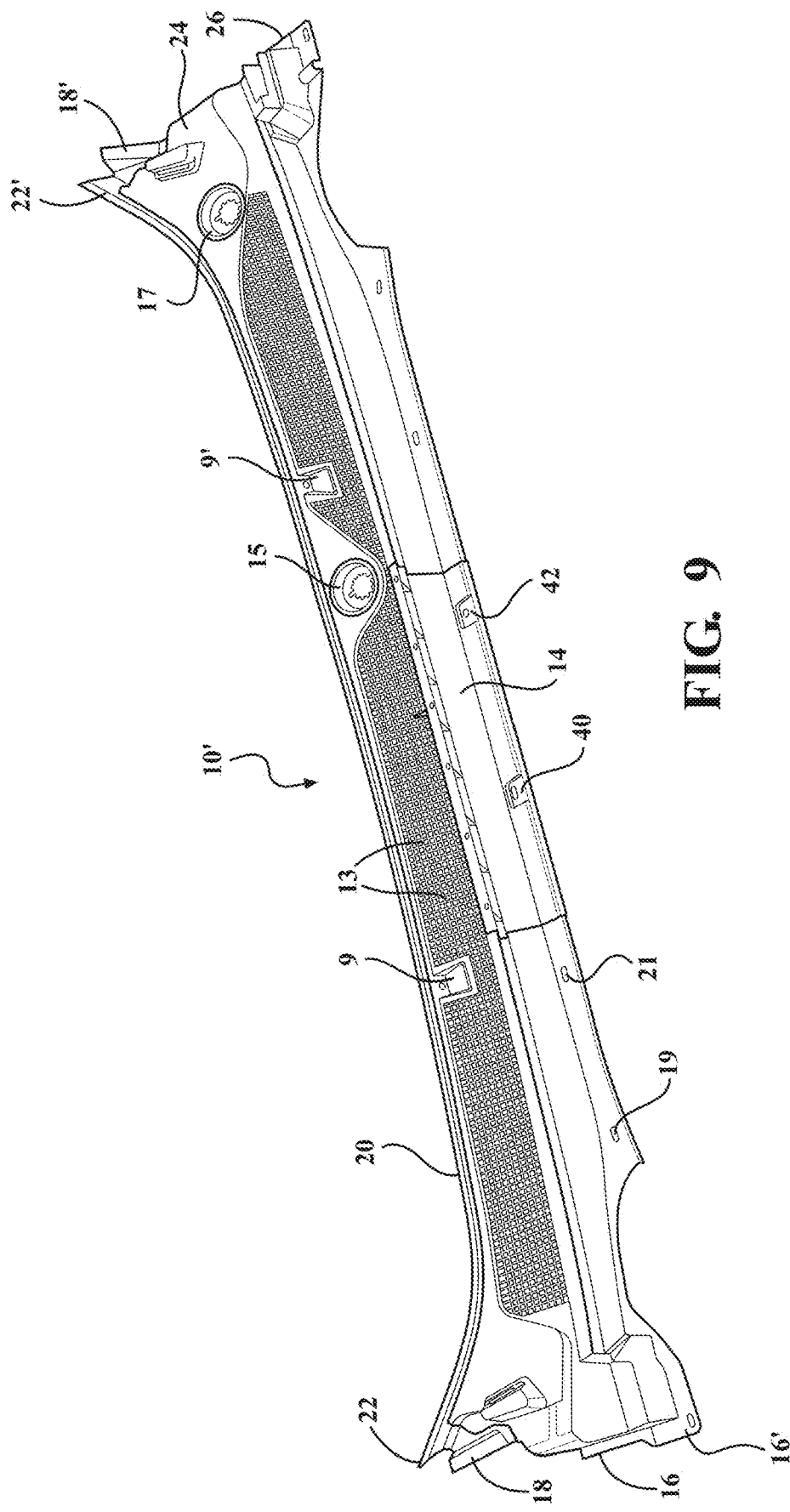
FIG. 9 is a substantial repeat of the panel depicted in FIG. 1 according to a further preferred embodiment.

Proceeding to FIG. 9, a further illustration is generally shown at 10' of a substantial repeat of the panel depicted in FIG. 1 and according to a further preferred embodiment. The air inlet panel 10', while substantially similar in appearance to that depicted at 10 in FIG. 1, provides additional clarifying descriptions as to specific details (including in particular mechanical locking aspects) associated with the engaging interface established between the first shot main rigid body 12 and the third shot nylon heat shield 14, the latter of which does not readily bond to polypropylene thus requiring the integration of mechanical features for locking the nylon shield to the surrounding edges of the polypropylene first shot rigid body 12. For purposes of the discussion of FIG. 9 et seq., common features to the variant of FIG. 1 will be repetitively numbered without additional explanation.

Figure 10:
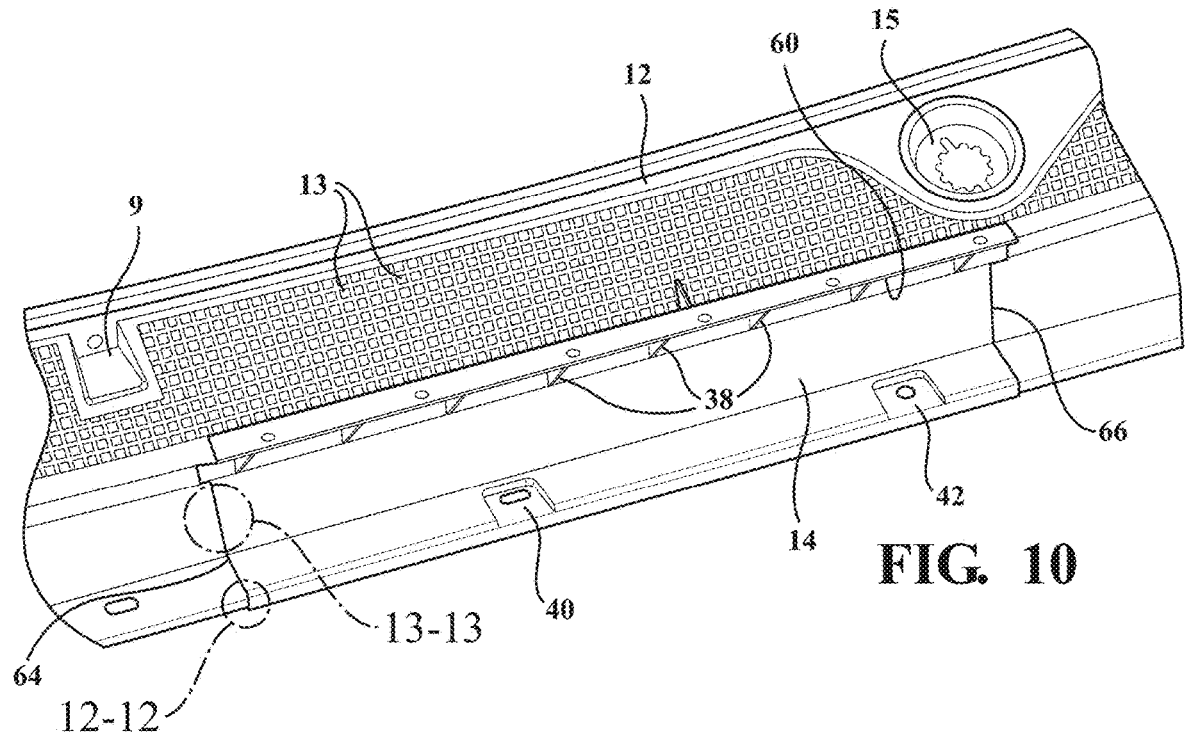
FIG. 10 illustrates is an enlargement of an intermediate portion of the three shot panel similar to that shown in FIG. 7 and depicting the interface between the nylon heat shield and surrounding rigid first shot polypropylene body.

With further reference to FIG. 10, an enlarged illustration is provided of an intermediate portion of the three shot panel, similar to that previously shown in FIG. 7, and depicting the interface between the nylon heat shield 14 and the surrounding interface of the rigid first shot polypropylene body 12 which configures the surrounding cutout recess. The angled reinforced portions 38 configured in the heat shield 14 are again depicted extending between the main front surface 14 and upper angled edge surface, see at 60, of the shield for providing the desired additional structural integrity along its upper extending length when secured to the interior cutout profile of the main body 12. As will be further described with reference to FIGS. 12-13, the side edge interfaces, see at 64 and 66, established at the overlapping locations of the heat shield 14 and the rigid main body 12 incorporate mechanical locking locations to ensure affixation of the heat shield within the overlapping and mating surface locations of the cutout recess.

Figure 11:
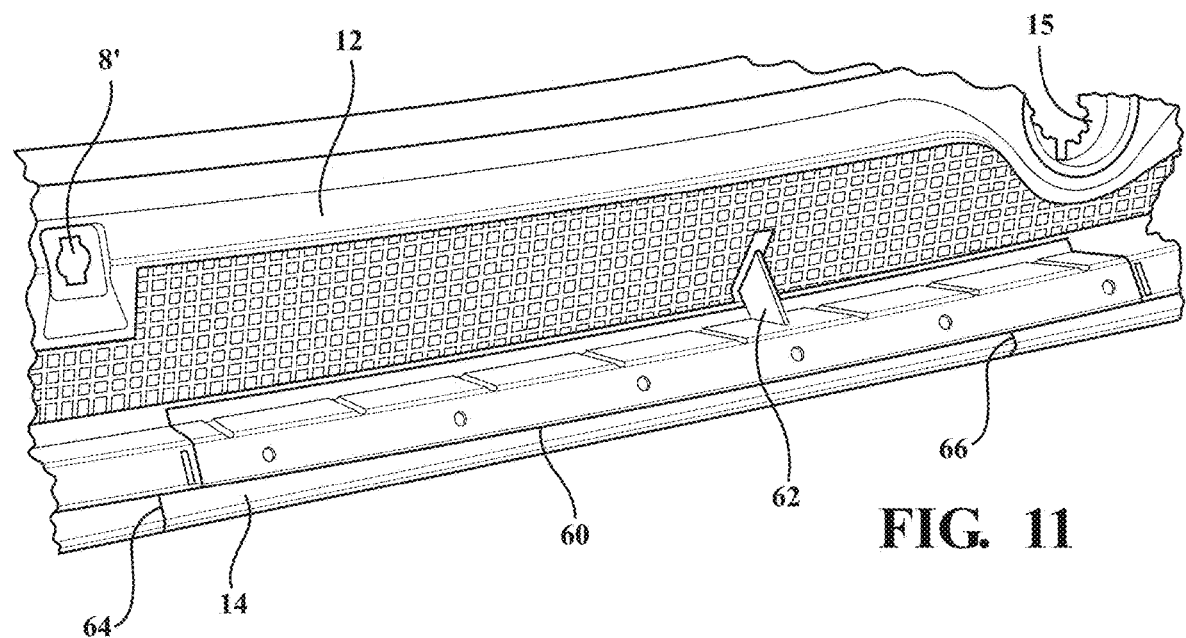
FIG. 11 is an enlarged and further rotated view of the panel depicted in FIG. 10 and showing a number of the in-molded features associated with the cutout recess upper length extending interface edge established between the first shot rigid molded material and the heat shield from another perspective.

FIG. 11 is an enlarged and further rotated view of the panel depicted in FIG. 10 and showing a number of the in-molded features associated with the cutout recess upper length extending interface edge established between the first shot rigid molded material 12 and the heat shield panel 14, shown from another perspective. The upper angled edge surface 60 of the heat shield 14 also depicts abutting portions 62 which, in combination with the mechanical locking features designed into the heat shield to rigid main body interfaces, provide additional support for maintaining in position the heat shield portion of the panel.

Figure 12:
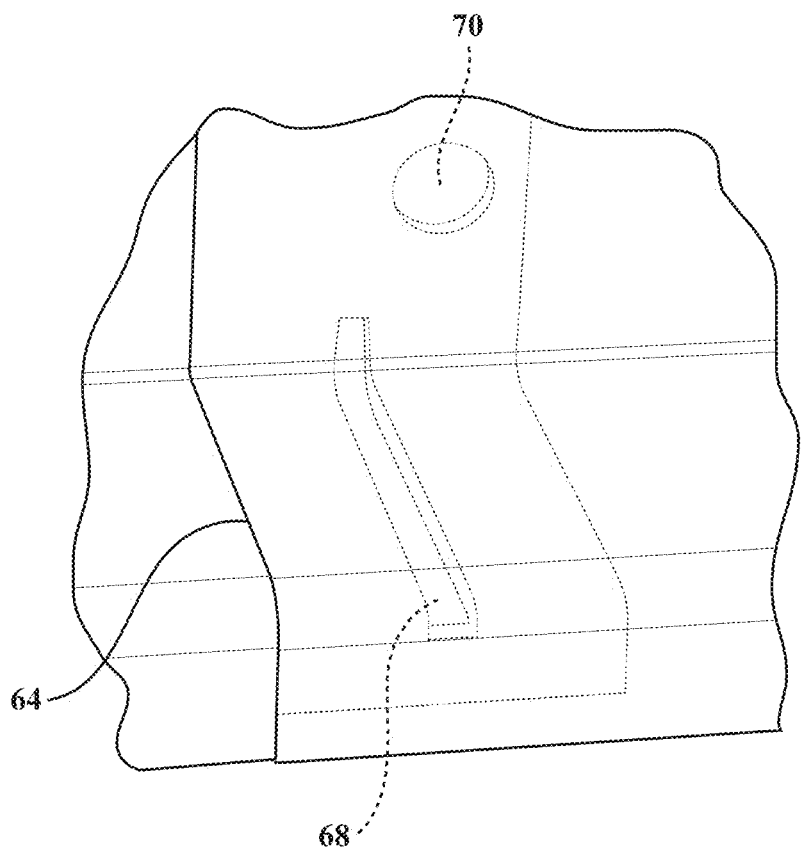
FIG. 12 is a further enlarged partial view of area 12-12 in FIG. 10 (similar to that shown in FIG. 5A) and depicting the dovetail locking feature established between the lower edge portion of the nylon third shot heat shield and the opposing underside receiving profile of the first shot rigid polypropylene layer.

Proceeding to FIG. 12 is a further enlarged partial view of area 12-12 of the first side interface 64 between the heat shield 14 and main body 12 as depicted in FIG. 10 (similar to that shown in FIG. 5A). FIG. 12 depicts a variation 68 of the dovetail locking feature established between the lower edge portion of the nylon third shot heat shield 14 and the opposing underside receiving profile (see again as previously shown at 50 in FIG. 8) of the first shot rigid polypropylene layer 12.

Figure 13:
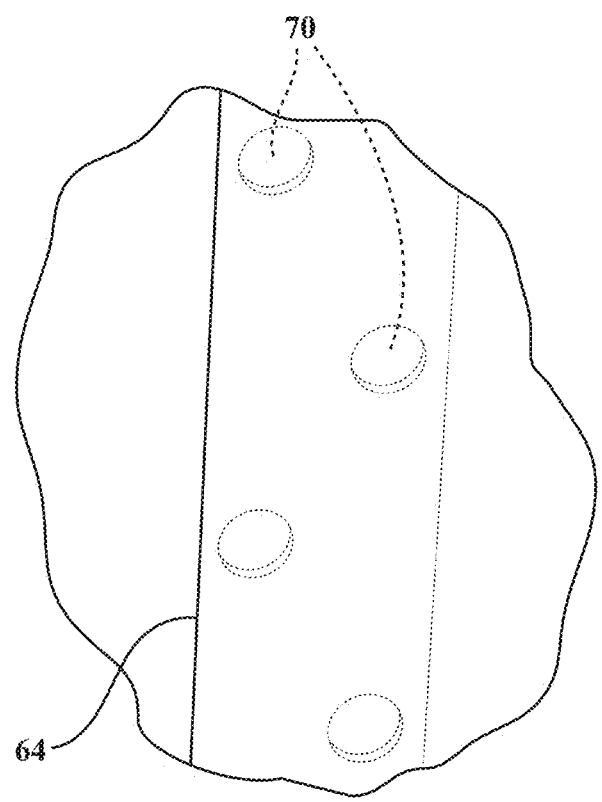
FIG. 13 is a further enlarged partial view of area 13-13 in FIG. 10 and depicting the opposing button recess and projection profile established between the aligning underside of the heat shield and the supporting side edge profile of the rigid first shot material along the cutout recess sides.

FIG. 13 is a further enlarged partial view of area 13-13 in FIG. 10 and depicting the opposing button recess and projection profile, these shown at phantom representations 70 and which are understood to be similar to the closed rim profiles 54 and opposing surface projecting posts 56 established between the aligning underside of the heat shield panel and the supporting side edge profiles of the rigid first shot material along the cutout recess sides.

FIG. 14 is an illustration of a press mold cavity half and representative of the three shot injection molding process according to the present invention, showing subset representations at each of 72 of the first shot rigid body formation step and at 74 for a third shot heat shield/nylon portion formation step. A block shaped location 75 is also depicted which, in the initial first shot formation step 72, provides for formation of the recess cutout profile depicted in the first stage part of FIG. 15. Upon employing the rotary, die slide or pick-and-place structure (not shown) the first stage formed part of FIG. 15 is repositioned within the mold assembly so that it is not in contact with the block location 75 and to allow subsequent formation of the heat shield component 14 (such as injection molded from nylon) and along with the separate soft shot injection molding at locations (e.g. at 20 as well as again within wiper blade recesses 15 and 17).

FIG. 15 is a part illustration of the first shot rigid body, generally at 76, formed in the first step and which corresponds to an insert location 78 which is incorporated into the first stage or configuration of the mold for forming the rigid main body 12 (again also represented at 74 in FIG. 15) and corresponding to that shown in exploded fashion in FIG. 3 with the cutout recess defining support surfaces.

FIG. 16 is a succeeding part illustration of the completed three shot panel, represented generally at 78, formed in the third shot nylon shield forming step. The intermediate second shot formation of the softer edge materials (see again as depicted at locations 20, 18/18', 22/22') are not depicted in the mold assembly of FIG. 14, however are represented in the part 78 of FIG. 16 and can be produced concurrent with the third shot injection molding of the nylon heat shield. It is also envisioned that the second shot softer materials can be produced in a separate mold configuration stage either before or after formation of the heat shield panel.

As described, the nylon or other suitably configured heat shield 14 is formed of a material not consistent with bonding with the first shot polypropylene, thereby requiring the design of the fasteners or locks between the head shield and the rigid body. As described, the fastener profiles are created during the injection molding of the heat shield in contact with the opposing supporting profiles of the rigid body.

In operation, the three shot mold process for creating the air inlet panel includes, in a first step, closing the mold and injecting the rigid plasticized (again such as polypropylene) material in order to form the rigid main body with the cutout recess for eventual formation of the heat shield component. After sufficient cooling, the mold is opened and the core or back half of the mold is actuated by any type of transfer mechanism (such as being rotated) to a further (or second) mold configuration, at which point the mold is reclosed and the second softer shot materials (by example TPE) are injection molded at locations along the first shot rigid material, with the heat shield usually being simultaneously formed at the location of the cutout recess and with the fastener/lock configurations also formed in order to bond the shield to the main panel.

The mold press operation can be further configured such that, during the simultaneous second softer plastic and third shot nylon heat shield formation stages in mold configuration 74, the initial configuration 72 in FIG. 14 can received a simultaneous first shot rigid material. Without limitation, any suitable reconfiguration of the mold assembly and associated forming processes are envisioned and which would permit for alternately producing the heat shield component in a third successive injection molding process (i.e. a third reconfiguration of the mold) and which can include the use of additional mold transfer (i.e. die slide and/or pick-and-place) functionality in order to form the heat shield layer within the multi-sided recess of the main body portion.

Having described our invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The invention claimed is:

1. A method for forming a multi-shot panel for a vehicle, comprising the steps of:
   providing a mold having first and second mold halves defining a cavity according to a first configuration;
   forming a main body of the panel from a first injection molding of a rigid plasticized material introduced into the cavity, said step of forming the main body portion further including forming an outer edge-exposed multi-sided recess, said recess having angled end surfaces;
   transferring the main body having the multi-sided recess to a second reconfiguration of the mold and forming upon the main body at least one second softer plasticized material which is softer than said first rigid plasticized material; and
   forming in a third reconfiguration of the mold a heat deflecting shield within the multi-sided recess of the main body with the softer plasticized material formed thereon, said heat deflecting shield being structurally integrated into the main body and formed from any material which provides any of heat deflecting or resistant properties at the location of maximum heat exposure.

2. The method as described in claim 1, said step of forming a heat deflecting shield further comprising forming from a nylon.

3. The method as described in claim 1, said step of forming a heat deflecting shield further comprising forming from a thermoset or other polymeric compound.

4. The method of claim 1, further comprising the step of forming a dovetail joint between overlapping edge surfaces defined along the multi-sided recess between the main body and the heat shield.

5. The method of claim 1, further comprising the step of forming a post and hole joint between overlapping edge surfaces defined along the multi-sided recess between the main body and the heat deflecting shield.

6. The method of claim 1, further comprising the rigid plasticized material for forming the main body further comprising forming from any of a polypropylene (PP) or polyethylene terephthalate (PET) material.

7. The method of claim 1, further comprising the step of forming the second softer material from any of a theremoplastic elastomer (TPE) or thermoplastic styrenic elastomer (TPS).

8. The method of claim 1, the step of forming the main body further comprising forming each of aperture grating at interior extending locations associated with the first hard shot material, as well as wiper blade shaft mount locations and spaced apart lower edge proximate clip/fastener mounting apertures.

9. The method of claim 1, the step of forming the heat deflecting shield further comprising forming angled reinforced portions between a main surface and upper angled edge surface for providing additional structural integrity along an upper extending length when secured to the multi-sided recess.

10. The method of claim 1, the step of forming the heat deflecting shield further comprising forming with a modified "U" shape.

* * * * *